(12) United States Patent
Hall et al.

(10) Patent No.: US 10,178,745 B2
(45) Date of Patent: Jan. 8, 2019

(54) METHOD OF CHARGING A LIGHT BULB

(71) Applicants: David R. Hall, Provo, UT (US); Joe Fox, Spanish Fox, UT (US)

(72) Inventors: David R. Hall, Provo, UT (US); Joe Fox, Spanish Fox, UT (US)

(73) Assignee: Hall Labs LLC, Provo, UT (US)

( * ) Notice: Subject to any disclaimer, the term of this patent is extended or adjusted under 35 U.S.C. 154(b) by 159 days.

(21) Appl. No.: 15/281,831

(22) Filed: Sep. 30, 2016

(65) Prior Publication Data

US 2018/0098404 A1    Apr. 5, 2018

(51) Int. Cl.
*H05B 33/08* (2006.01)
*H05B 37/02* (2006.01)
*F21S 9/02* (2006.01)
*F21V 23/04* (2006.01)
*F21K 9/232* (2016.01)
*F21Y 115/10* (2016.01)
*H05B 37/03* (2006.01)

(52) U.S. Cl.
CPC ..... *H05B 37/0281* (2013.01); *H05B 33/0803* (2013.01); *H05B 33/0842* (2013.01); *H05B 33/0845* (2013.01); *H05B 37/0227* (2013.01); *H05B 37/0272* (2013.01); *F21K 9/232* (2016.08); *F21S 9/02* (2013.01); *F21V 23/04* (2013.01); *F21Y 2115/10* (2016.08); *H05B 37/034* (2013.01)

(58) Field of Classification Search
CPC ............ H05B 33/0884; H05B 33/0845; H05B 37/0272; H05B 37/0281; F21S 9/02; F21V 23/04
USPC .......................................................... 307/39
See application file for complete search history.

(56) References Cited

U.S. PATENT DOCUMENTS

| | | | | |
|---|---|---|---|---|
| 7,460,006 B2 * | 12/2008 | Kates | ....................... | G08B 1/08 340/425.1 |
| 9,534,773 B1 * | 1/2017 | Turudic | ................ | F21V 23/005 |
| 2014/0265845 A1 * | 9/2014 | Williams | ........... | H05B 37/0245 315/86 |

* cited by examiner

*Primary Examiner* — Dinh T Le (57) ABSTRACT

A method of charging a light bulb is disclosed. A processor within the light bulb detects a state-of-charge of the battery and if it is below a predetermined dynamic battery state-of-charge threshold then the transceiver sends a wireless signal from the light bulb to a remote light switch with instructions to supply power to the light bulb. The predetermined dynamic battery state-of-charge threshold may be determined based on historical light use data during an on-peak energy time period. The predetermined dynamic threshold allows a battery in the light bulb to supply energy to the light bulb during on-peak hours and recharge during off-peak hours.

20 Claims, 10 Drawing Sheets

METHOD OF CHARGING A LIGHT BULB

BACKGROUND

Field of the Invention

The present invention relates to methods of charging a light bulb with an embedded battery and processor.

SUMMARY

This invention has been developed in response to the present state of the art and, in particular, in response to the problems and needs in the art that have not yet been fully solved by currently available systems and methods. Accordingly, a method of charging a light bulb has been developed. Features and advantages of different embodiments of the invention will become more fully apparent from the following description and appended claims, or may be learned by practice of the invention as set forth hereinafter.

A method of charging a light bulb is disclosed. A processor within the light bulb detects a state-of-charge of the battery and if it is below a predetermined dynamic battery state-of-charge threshold then a transceiver sends a wireless signal from the light bulb to a remote light switch with instructions to supply power to the light bulb. The predetermined dynamic battery state-of-charge threshold may be determined based on historical light use data during an on-peak energy time period. The predetermined dynamic threshold allows a battery in the light bulb to supply energy to the light bulb during on-peak hours and recharge during off-peak hours.

The light bulb may comprise an Edison screw base. A processor input may be derived from a wire which connects the remote light switch to the light bulb. An input from the remote light switch may cause the light bulb to remain in an "OFF" state while the battery is charging unless a user toggles the light bulb "ON" causing a wireless or wired signal to be transmitted from the remote light switch to the light bulb. A predetermined battery state-of-charge threshold may be dynamically determined based on a time-of-day. A predetermined battery state-of-charge threshold may be dynamically determined based on a cost-per-kilowatt-hour and a time-of-day. The light bulb may be automatically controlled by the processor to change an output intensity of the light bulb based on a time-of-day. The light bulb may be automatically controlled by the processor to change an output intensity of the light bulb based on a state-of-charge of the battery. The light bulb may be automatically controlled by the processor to change an output intensity of the light bulb based on a state-of-charge of the battery and an expected output of the battery over a predetermined time period. If the remote light switch is toggled from an "ON" state to an "OFF" while the light bulb is charging and the charge of the battery is below the predetermined battery charge threshold, the light bulb may turn "OFF" and the power may stay supplied to the light bulb. The light bulb may comprise one or more light sources. The one or more light sources may be LED (light emitting diode) light sources. The LED light sources may surround the battery within the light bulb. Each of the one or more LED light sources may be individually controllable by the processor. The processor may be programmed to selectively turn "ON" or "OFF" each of the one or more LED light sources based on a desired intensity of the light bulb. The processor may be programmed to selectively turn "ON" or "OFF" each of the one or more LED light sources based on a desired color of the light bulb. The processor may be programmed to selectively turn "ON" or "OFF" each of the one or more LED light sources based on a state-of-charge of the battery.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

A detailed description of the claimed invention is provided below by example, with reference to embodiments in the appended figures. Those of skill in the art will recognize that the components of the invention as described by example in the figures below could be arranged and designed in a wide variety of different configurations. Thus, the detailed description of the embodiments in the figures is merely representative of embodiments of the invention, and is not intended to limit the scope of the invention as claimed.

In some instances, features represented by numerical values, such as dimensions, mass, quantities, and other properties that can be represented numerically, are stated as approximations. Unless otherwise stated, an approximate value means "correct to within 50% of the stated value." Thus, a length of approximately 1 inch should be read "1 inch+/−0.5 inch."

Aspects of the present invention are described herein with reference to flowchart illustrations and/or block diagrams of methods, apparatus (systems), and computer program products according to embodiments of the invention. Those of skill in the art will understand that each block of the flowchart illustrations and/or block diagrams, and combinations of blocks in the flowchart illustrations and/or block diagrams, may be implemented by computer readable program instructions. Additionally, those of skill in the art will recognize that the system blocks and method flowcharts, though depicted in a certain order, may be organized in a different order and/or configuration without departing from the substance of the claimed invention.

Figure 1:
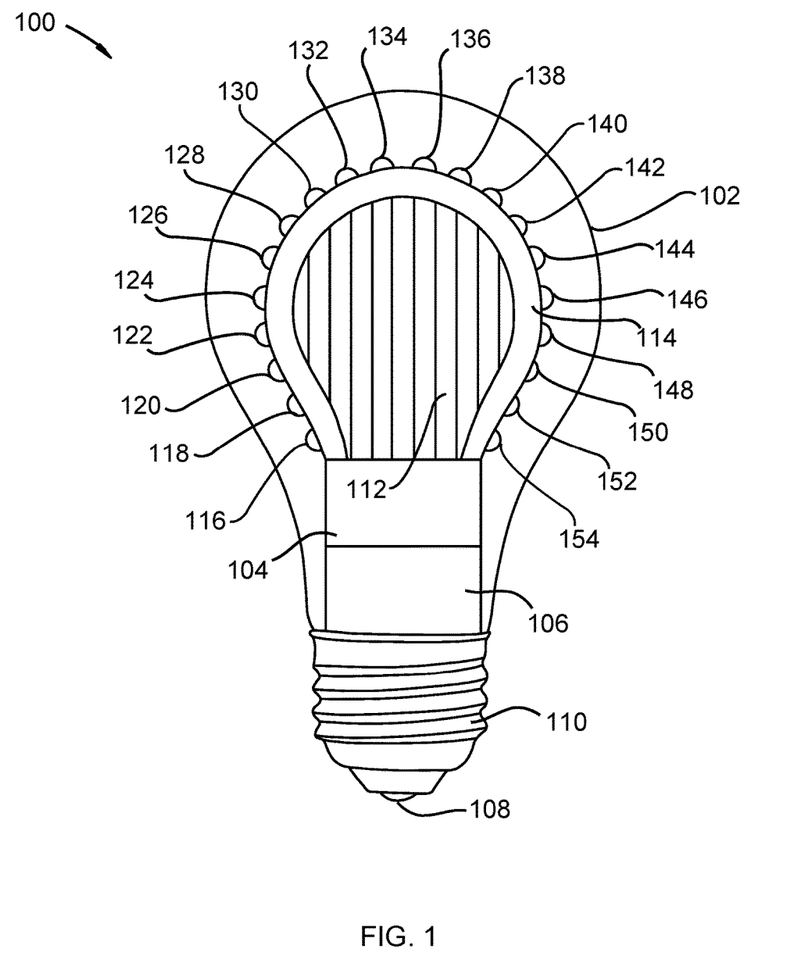
FIG. 1 shows a light bulb in accordance with an embodiment of the invention.

FIG. 1 shows a light bulb in accordance with an embodiment of the invention. Light bulb 100 includes external transparent surface 102, screw base conductors 110 and 108, controller 104, power supply 106, substrate 114, one or more lights 116-154, and battery 112, all of which are operably connected to form light bulb 100. Controller 104 includes one or more processors, memory, and one or more wireless transceivers. The memory includes instructions including a method of charging light bulb 100, instruction for controlling one or more lights 116-154, instructions for communicating with one or more wireless devices using one or more wireless transceivers within controller 104, instructions for communicating wirelessly over networks including local and wide area networks, instructions for communication over the Internet and remote database servers. The method includes detecting, with the processor and memory in the light bulb, that battery 112 within light bulb 100 is below a predetermined battery state-of-charge threshold. The method also includes sending a wireless signal from wireless transceiver 106 within light bulb 100 to a remote light switch to supply power to light bulb 100. The method further includes charging battery 112 to a second predetermined battery state-of-charge threshold via an external power source.

A state-of-charge of a battery may be determined by well-known and documented methods such as detecting an instantaneous current and/or voltage representative of a battery state-of-charge. Another commonly used method is measuring an open circuit voltage of a battery. In general, a voltage of a battery, while the current is constant, is proportionally representative of a state-of-charge of the battery. As a batteries state-of-charge decreases, the voltage of the battery also decreases. Different types of batteries have different voltage/state-of-charge curves. For each battery type the state-of-charge curves are usually very consistent.

Battery 112 is coupled to a power source; which power source is also coupled to the remote light switch. Battery 112 may be any of a variety of battery types, including lead-acid, nickel-cadmium, nickel-metal hydride, lithium-ion, lithium-ion polymer, etc. In some embodiments, light bulb 100 includes an Edison screw base. This base may be screwed into a light fixture mounted, for example, in a lamp, ceiling light, porch light, automobile light, etc.

In some embodiments, light bulb 100 is automatically controlled by the processor to change an output intensity of the light bulb based on a time-of-day. For example, in some embodiments, during evenings (evenings meaning between approximately 6:00 pm and midnight) light bulb 100 may emit light at a relatively high intensity. In contrast, during nights and early mornings (nights and early mornings meaning between approximately midnight and 6 am) light bulb 100 may be dimmed to emit light at a relatively low intensity. In addition, during mornings and afternoons (mornings and afternoons meaning between approximately 6 am and 6 pm) light bulb 100 may emit light at a relatively moderate intensity. In some further embodiments, the processor may be programmable by a user via wireless transmitter 106 or via a wire such that light intensity variation with time-of-day may be customizable. For example, in some embodiments, a user may communicate with light bulb 100 via wireless transceiver 106 and a peripheral device. Due to communication with light bulb 100 and the processor a user may conveniently change settings with regards to light intensity based on parameters such as time-of-day. The peripheral device may be any of a number of devices including a cellular phone, a laptop, a tablet, a server, etc.

Battery 112 may charge by means of any of a variety of power sources including a wall outlet, light fixture wiring, solar panels, a generator, etc. In some embodiments, battery 112 may be a supercapacitor. Battery 112 may be coupled to a high charge rate power supply.

In some embodiments, light bulb 100 is automatically controlled by the processor to change an output intensity of light bulb 100 based on a state-of-charge of battery 112. Light bulb 100, for example, may decrease its output intensity when the controller detects that the state-of-charge of battery 112 is below a predetermined battery state-of-charge threshold. Light bulb 100 may continue to output a decreased intensity of light until it has reached a higher state of charge. Additionally, in some embodiments, the processor may take into account whether an external power source is coupled to light bulb 100 when determining whether to change the output intensity of light bulb 100. In some embodiments, the output intensity of light bulb 100 may increase and decrease in a sinusoidal pattern to indicate that the state-of-charge of battery 112 is relatively low.

In some embodiments, light bulb 100 includes one or more light sources. Light bulb 100 may have a single light source, such as a halogen or incandescent light source. In some other embodiments, the one or more light sources 116 through 154 are light emitting diode (LED) light sources. In some further embodiments, light bulb 100 includes a single LED light source 116.

In some embodiments, LED light sources 116 through 154 surround battery 112 within light bulb 100. LED light sources 116 through 154 may be coupled to printed circuit board (PCB) 114. PCB 114 may be flexible or rigid. In some embodiments, each one of LED light sources 116 through 154 is individually controllable by the processor. In some embodiments, the processor is programmed to selectively turn "ON" or "OFF" each of LED light sources 116 through 154 based on a desired intensity of light bulb 100.

In some embodiments, the processor is programmed to selectively turn "ON" or "OFF" each of LED light sources 116 through 154 based on a desired color of light bulb 100. LED light sources 116 through 154 may be comprised of tri-color LED light sources and may combine different colors at the same time to make light bulb 100 emit a single combination color or a conglomeration of distinct colors.

In some embodiments, the processor is programmed to selectively turn "ON" or "OFF" each of LED light sources 116 through 154 based on a state-of-charge of battery 112. For example, when the state-of-charge of battery 112 is below a predetermined batter state-of-charge threshold light source 116 may decrease its output intensity by using fewer LEDs within the light bulb. Subsequently, if light bulb 100 includes multiple LED light sources, LED light sources 118 through 154 emit a same or different single color in sequence. In some embodiments, a controller processor is programmed to save battery power by selectively turning "ON" or "OFF" LED light sources 116-154. In other embodiments, a remote server processor is programmed to save battery power by selectively turning "ON" or "OFF" LED light sources 116-154. Local or remote processors may be programmed to determine optimal threshold charging bounds of a first predetermined battery state-of-charge threshold based on an expected output of the battery over a predetermined time period using historical light usage data. This data may be stored in a local memory in the light bulb or in a remote database. Local or remote processors may be programmed to determine optimal threshold charging bounds charge threshold based on a cost-per-kilowatt-hour of electricity and/or a time-of-day. Predetermined battery state-of-charge threshold amounts may be dynamically set or changed based on a light usage history and/or on a cost-per-kilowatt-hour of electricity and/or a time-of-day. For instance, when a light bulb is installed, light bulb controller programming may cause the light to obtain location data and electricity rate data. Location data may be obtained from a global positioning satellite GPS, a cellular tower transmission, an Internet location, or from a user device. Electrical time-of-use rates may be obtained from a global positioning satellite, a cellular tower transmission, an Internet location, or from a user device. Time-of-use rates include cost-per-kilowatt-hour over a 24-hour period for different times of the day. Time-of-use rates may change season by season. Summer months may have a different time-of-use rate table compared to winter months. In a 24-hour period during summer months, off-peak, on-peak, and partial-peak time-of-use electrical rates may be determined based on a geographic location, time-of-day, and season of the year. An off-peak time period may be from 10:00 pm to 5:00 am in one geographic location and from 6:00 pm to 8:00 am in another geographic location. On-peak and partial-peak time periods also vary according to geographic location. Cost-per-kilowatt hour for off-peak may be 0.10/KWH while on-peak may be double or triple at 0.20/KWH or 0.30/KWH with partial-peak rates somewhere in between, for instance.

A battery state-of-charge threshold may be dynamically determined state-of-charge threshold based on an expected output of the battery over a predetermined time period using historical light usage data. For example, if a given LED light consumed 15 watts (similar to a 100 watt incandescent) for 1 hour a day on average during on-peak time a battery within the light would need to have sufficient power to power the light and the controller until an off-peak time period when the battery could be recharged with off-peak priced energy. To determine a lower battery state-of-charge threshold a watt hour calculation may be made by multiplying 15 watts consumed by 1 hour to obtain 15 watt hours. If we assume the controller in the light bulb consumes on average 3 watts per hour, a battery in the light bulb has a 600 watt hour capacity, a 20% safety charge limit is desired to remain in the battery, time-of-use rates are available, current time-of-day information is available, and expected use times from historical data are available, then we may use this information determine a lower state-of-charge safety limit threshold. A lower limit may be set as the amount of power needed to keep the battery above a lower limit state-of-charge safety of 20% while providing operational power and lighting power necessary to reach an off-peak charging time. The lower limit state-of-charge threshold can be calculated by totaling all power needed to keep the battery from going below a 20% power safety limit. If we assume (or obtain from historical records) that a light consumes 15 watts and is on for 1 hour (15 watt hours) of on-peak use, an on-peak time period lasts for a total of 6 hours per day then the total wattage consumption to reach off-peak charging time is calculated by adding 15 watt hours+15 watt hours=30 watt hour consumed during a 6 hour on-peak time period. A 20% safety limit on a 600 watt hour battery may be calculated by multiplying 600 by 0.2 to equal 120 watt hours of safety power desired to remain in the battery. The lower state-of-charge threshold may be calculated by adding 30 watt hours of power consumed by the light in the 6 hour on-peak time period and 120 watt hours of safety charge to obtain a lower state-of-charge limit of 150 watt hours. This lower state-of-charge limit is the minimum amount of power needed in the battery at the start of an on-peak period to make it on battery power to an off-peak time period. The lower threshold limit is dynamic and changes with light usage, battery capacity, safety limit values, and operational light bulb wattage. This limit may be programmed to optimized power consumption costs of using the light bulb.

Figure 2:
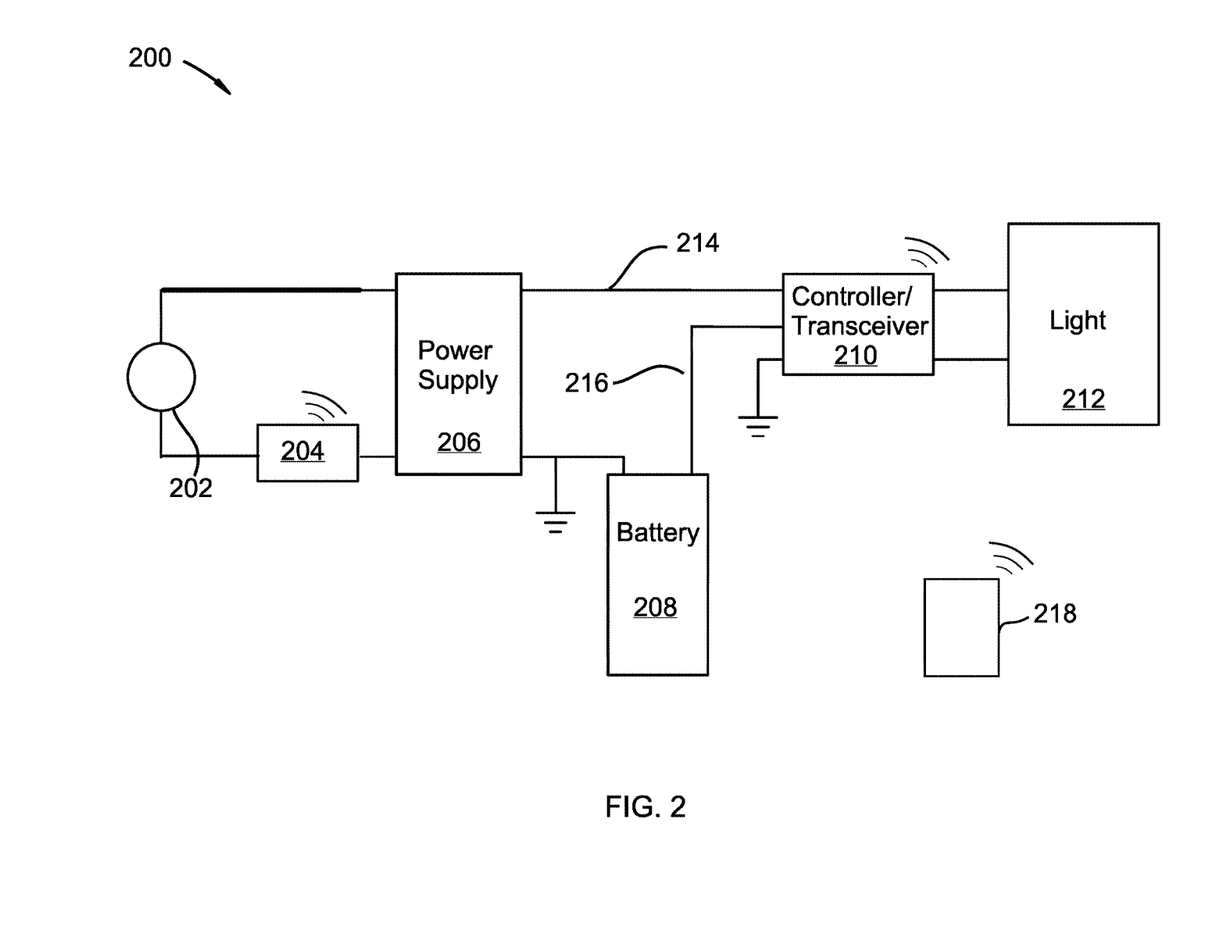
FIG. 2 shows a schematic diagram in accordance with an embodiment of the invention.

FIG. 2 shows a schematic diagram 200 in accordance with an embodiment of the invention. Schematic diagram 200 includes power source 202, switch device 204, power supply 206, battery 208, controller/transceiver 210, light 212, inputs 214 and 216, and remote user device 218. Power source 202 may be an electrical generator, solar power, hydroelectric power, or any other know power source. Switch device 204 may be a smart switch with wireless and wired features. Switch 204 may send and receive wireless signals and communicate with transceiver/controller 210 and user device 218. Switch 204 may also contain a button, switch, or lever for toggling a state of the light 212. Switch 204 may be a switch that is directly controlled by transceiver/controller 210 and indirectly controlled by a user toggling a button or switch located directly on the switch. For instance, when a user toggles a switch on the face of switch 204, switch 204 may not directly turn off power to light 212 but send a wired or wireless signal to a transceiver/controller 210. When transceiver 210 processes the sent signal from the switch, controller/transceiver 210 may decide to turn light 212 "ON" or "OFF" based on a previous state of light 212 and leave power through switch 202 "ON" or "OFF" based on a state-of charge of battery 208 and/or a time-of-day energy usage rate. User device 218 may be used to send a wireless signal to program transceiver/controller 210, instruct transceiver controller 210 to turn light 212 "ON" or "OFF" or to instruct switch device 204 to send a signal to transceiver/controller 210 to turn "ON" or "OFF" light 212. Power supply 206 may contain a switching power supply or inductive power supply, a rectifier circuit, a voltage regulator and filtering capacitors. Battery 208 may be a rechargeable battery as discussed in reference to FIG. 1. Transceiver/controller 210 may contain one or more processors, memory, antennas, and transceivers for transmitting/receiving Bluetooth, Wi-Fi, Sure-Fi, CDMA, GSM, etc. Inputs 214 and 216 allow battery 208 and/or power supply 202 to supply power to transceiver/controller 210 independent of each other. Transceiver/controller may decide to use power from input 214 or input 216 or both based on a state-of-charge of battery 208. During an off-peak time period controller/transceiver 210 may charge battery 208 through input/output 216 using input/output 214. During an on-peak time period, when battery 208 is critically low on charge, controller/transceiver 210 may charge battery 208 through input/output 216 using input/output 214. Transceiver/controller 210 may be connected to light 212 by two or more wires. Light 212 may contain multiple light sources such as LED light sources as shown and described in relation to FIG. 1. Each light source may have one or more wires connecting to transceiver/controller 210.

Figure 3:
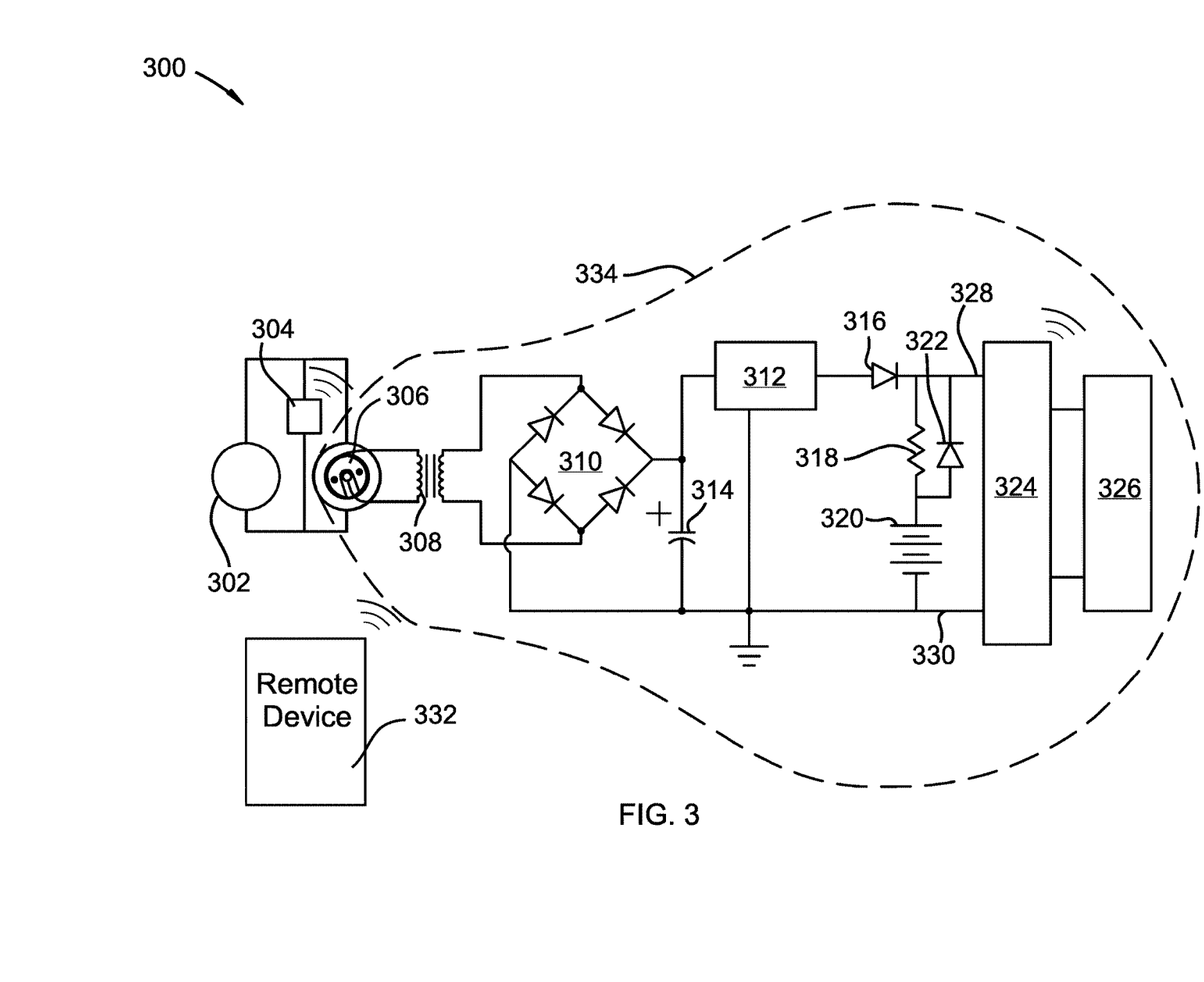
FIG. 3 shows a schematic diagram in accordance with an embodiment of the invention.

FIG. 3 shows a schematic diagram in accordance with an embodiment of the invention. Schematic diagram 300 includes power source 302, switch device 304, light socket 306, external light housing 334, power supply elements 310, 312, 314, battery 320, controller/transceiver 324, light 326, input 328, and remote user device 332. Power source 302 may be an electrical generator, solar power, hydroelectric power, or any other know power source. Light housing may include a screw base with at least two electrical conductors. The screw base may screw into a threaded socket 306. Switch device 304 may be a smart switch with wireless and wired features. Switch 304 may send and receive wireless signals and communicate with transceiver/controller 324 and user device 332. Switch 304 may also contain a button, switch, or lever for toggling a state of the light 326. Switch 304 may be a switch that is directly controlled by transceiver/controller 324 and indirectly controlled by a user toggling a button or switch located directly on the switch. For instance, when a user toggles a switch on the face of switch 304, switch 304 may not directly turn off power to light 326 but send a wired or wireless signal to a transceiver/controller 324. When transceiver/controller 324 processes the sent signal from the switch, controller/transceiver 324 may decide to turn light 326 "ON" or "OFF" based on a previous state of light 326 and leave power through switch 304 "ON" or "OFF" based on a state-of charge of battery 320 and/or a time-of-day energy usage rate. User device 332 may be used to send a wireless signal to program transceiver/controller 324, instruct transceiver/controller 324 to turn light 326 "ON" or "OFF" or to instruct switch device 304 to send a signal to transceiver/controller 324 to turn "ON" or "OFF" light 326. Battery 320 may be a rechargeable battery as discussed in reference to FIGS. 1 and 2. Transceiver/controller 324 may contain one or more processors, memory, antennas, and transceivers for transmitting/receiving Bluetooth, Wi-Fi, Sure-Fi, CDMA, GSM, etc. Input 328 may momentarily modulate a power signal supplied by switch 304 when switch 304 is toggled from an "OFF" or "NO" position. Controller/transceiver 324 may be programmed to detect a modulation in the power signal and turn light 326 "ON" or "OFF". A modulation may include a brief high to low to high power transition causing a ripple in the DC voltage supplied to controller 324. This transition may be created by a momentary (1 to 500 millisecond) break in the power supplied by switch 304 as it is toggled. Alternately, a wireless signal may be transmitted from switch 304 to controller/transceiver 324 when switch 304 is toggled instructing controller/transceiver 324 to toggle the light 326 "ON" or "OFF". Battery 320 and/or power supply 302 may supply power to transceiver/controller 324 independent of each other. Battery 320 is automatically charged when power is supplied to controller 324 by power source 320. In the event of a power failure battery 320 automatically provides power to input 328 by way of diode 322. Diode 316 allows current to flow from regulator 312 to battery 320 and controller/transceiver 326. Filter capacitor 314 may be designed to allow a particular modulation created by toggling switch 304 to pass by and be detected by controller 324. Resistor 318 allows a potential voltage to flow enabling charging of battery 320. During an off-peak time period controller/transceiver 324 may charge battery 320 by wirelessly turning on power to switch 304 without turning on lights 326. This would likely happen in the middle of the night without the knowledge of a home owner and while off-peak power is available. During an on-peak time period, when battery 320 is critically low on charge, controller/transceiver 324 may charge battery 320 by wirelessly turning on power to switch 304 without turning on lights 326. Transceiver/controller 324 may be connected to light 326 by two or more wires. Light 326 may contain multiple light sources such as LED light sources as shown and described in relation to FIG. 1. Each light source may have one or more wires connecting to transceiver/controller 324.

Controller 324 may use an internal reference load (not shown) to monitor a state of charge of battery 320. In an internal state-of-charge monitoring process of controller 324, a voltage taken from input 328 may be monitored as applied to a reference load and a state-of-charge of battery 320 may be obtained when the voltage is compared to a state-of-charge reference table stored in memory in controller 324. Optimally, the state-of-charge is taken some time before an on-peak time event happens, such as an hour before, allowing time to charge a battery off-peak if necessary before an on-peak time event takes place.

Figure 4:
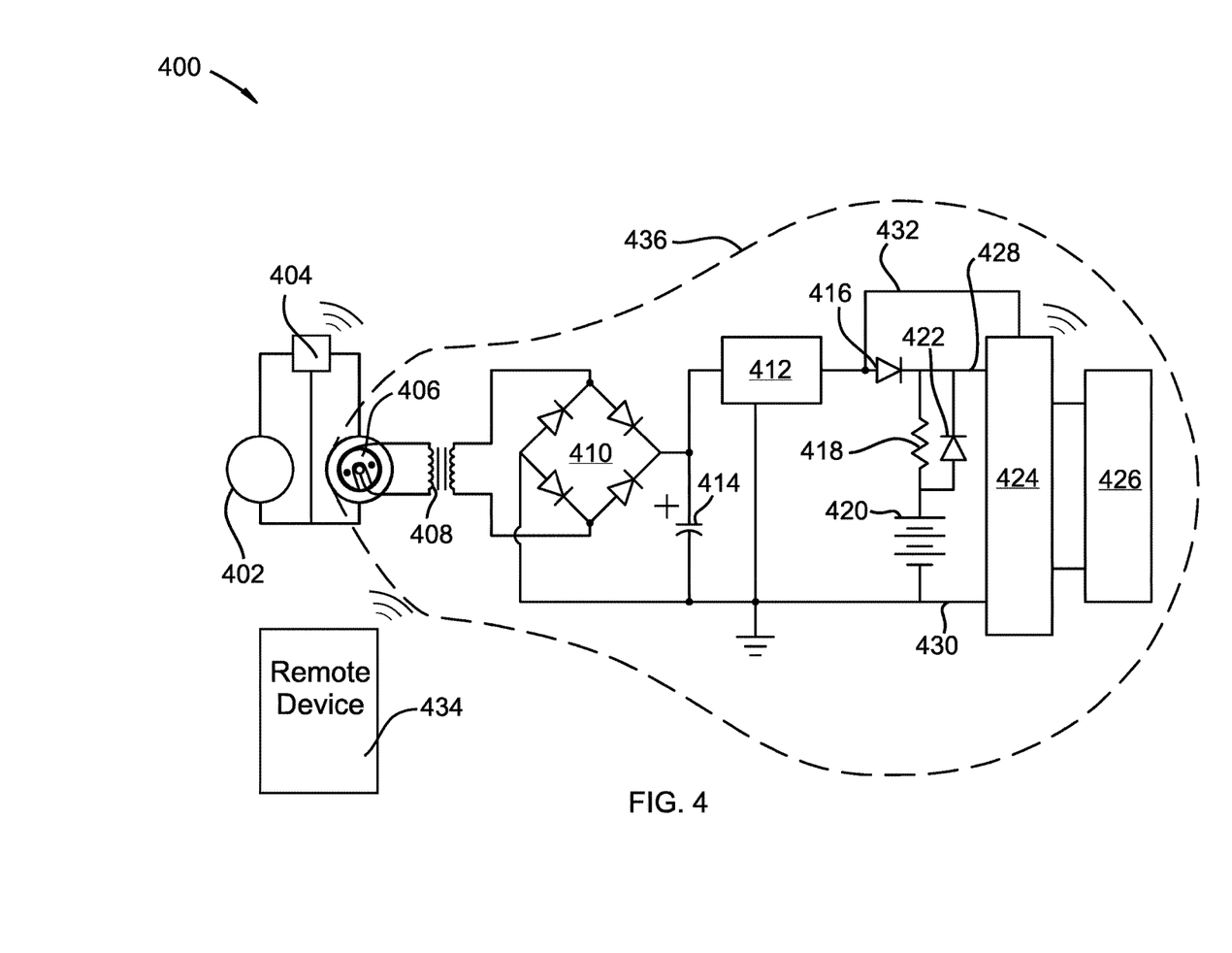
FIG. 4 shows a schematic diagram in accordance with an embodiment of the invention.

FIG. 4 shows a schematic diagram in accordance with an embodiment of the invention. Schematic diagram 400 includes power source 402, external light housing 436, light threaded light socket 406, switch device 404, power supply elements 410, 412, 414, battery 420, controller/transceiver 424, light 426, inputs 428 and 432, and remote user device 434. Power source 402 may be an electrical generator, solar power, hydroelectric power, or any other know power source. Light housing may include a screw base with at least two electrical conductors. The screw base may screw into a threaded socket 406. Switch device 404 may be a smart switch with wireless and wired features. Switch 404 may send and receive wireless signals and communicate with transceiver/controller 424 and user device 434. Switch 404 may also contain a button, switch, or lever for toggling a state of the light 426. Switch 404 may be a switch that is directly controlled by transceiver/controller 424 and indirectly controlled by a user toggling a button or switch located directly on the switch. For instance, when a user toggles a switch on the face of switch 404, switch 404 may not directly turn off power to light 426 but send a wired or wireless signal to a transceiver/controller 424. When transceiver/controller 424 processes the sent signal from the switch, controller/transceiver 424 may decide to turn light 426 "ON" or "OFF" based on a previous state of light 426 and leave power through switch 304 "ON" or "OFF" based on a state-of charge of battery 420 and/or a time-of-day energy usage rate. User device 434 may be used to send a wireless signal to program transceiver/controller 424, instruct transceiver/controller 424 to turn light 426 "ON" or "OFF" or to instruct switch device 404 to send a signal to transceiver/controller 424 to turn "ON" or "OFF" light 426. Battery 420 may be a rechargeable battery as discussed in reference to FIGS. 1 and 2. Transceiver/controller 424 may contain one or more processors, memory, antennas, and transceivers for transmitting/receiving Bluetooth, Wi-Fi, Sure-Fi, CDMA, GSM, etc. Inputs 428 and/or 432 may momentarily modulate a power signal supplied by switch 404 when switch 404 is toggled from an "OFF" or "NO" position. Controller/transceiver 424 may be programmed to detect a modulation in the power signal and turn light 426 "ON" or "OFF". A modulation may include a brief high to low to high power transition causing a ripple in the DC voltage supplied to controller 424. This transition may be created by a momentary (1 to 500 millisecond) break in the power supplied by switch 404 as it is toggled. Alternately, a wireless signal may be transmitted from switch 404 to controller/transceiver 424 when switch 404 is toggled instructing controller/transceiver 424 to toggle the light 426

"ON" or "OFF". Battery 420 and/or power supply 402 may supply power to transceiver/controller 424 independent of each other. Battery 420 is automatically charged when power is supplied to controller 424 by power source 420. In the event of a power failure battery 420 automatically provides power to input 428 by way of diode 422. Diode 416 allows current to flow from regulator 412 to battery 420 and controller/transceiver 424. Filter capacitor 414 may be designed to allow a particular modulation created by toggling switch 404 to pass by and be detected by controller 424. Resistor 418 allows a potential voltage to flow enabling charging of battery 420. During an off-peak time period controller/transceiver 424 may charge battery 420 by wirelessly turning on power to switch 404 without turning on lights 426. This would likely happen in the middle of the night without the knowledge of a home owner and while off-peak power is available. During an on-peak time period, when battery 420 is critically low on charge, controller/transceiver 424 may charge battery 420 by wirelessly turning on power to switch 404 without turning on lights 426. Transceiver/controller 424 may be connected to light 426 by two or more wires. Light 426 may contain multiple light sources such as LED light sources as shown and described in relation to FIG. 1. Each light source may have one or more wires connecting to transceiver/controller 424. By pass input line 432 may serve to inform controller 424 that power 402 has failed. Controller 424 may reduce power output of light 426 by decreasing a number of light sources receiving power, thus allowing light 426 to operate longer under reduced power consumption. Controller 424 may use an internal reference load (not shown) to monitor a state of charge of battery 420. In an internal state-of-charge monitoring process of controller 424, a voltage taken from input 428 may be monitored as applied to a reference load and a state-of-charge of battery 420 may be obtained when the voltage is compared to a state-of-charge reference table stored in memory in controller 424. Optimally, the state-of-charge is taken some time before an on-peak time event happens, such as an hour before, allowing time to charge a battery off-peak if necessary before an on-peak time event takes place.

Figure 5:
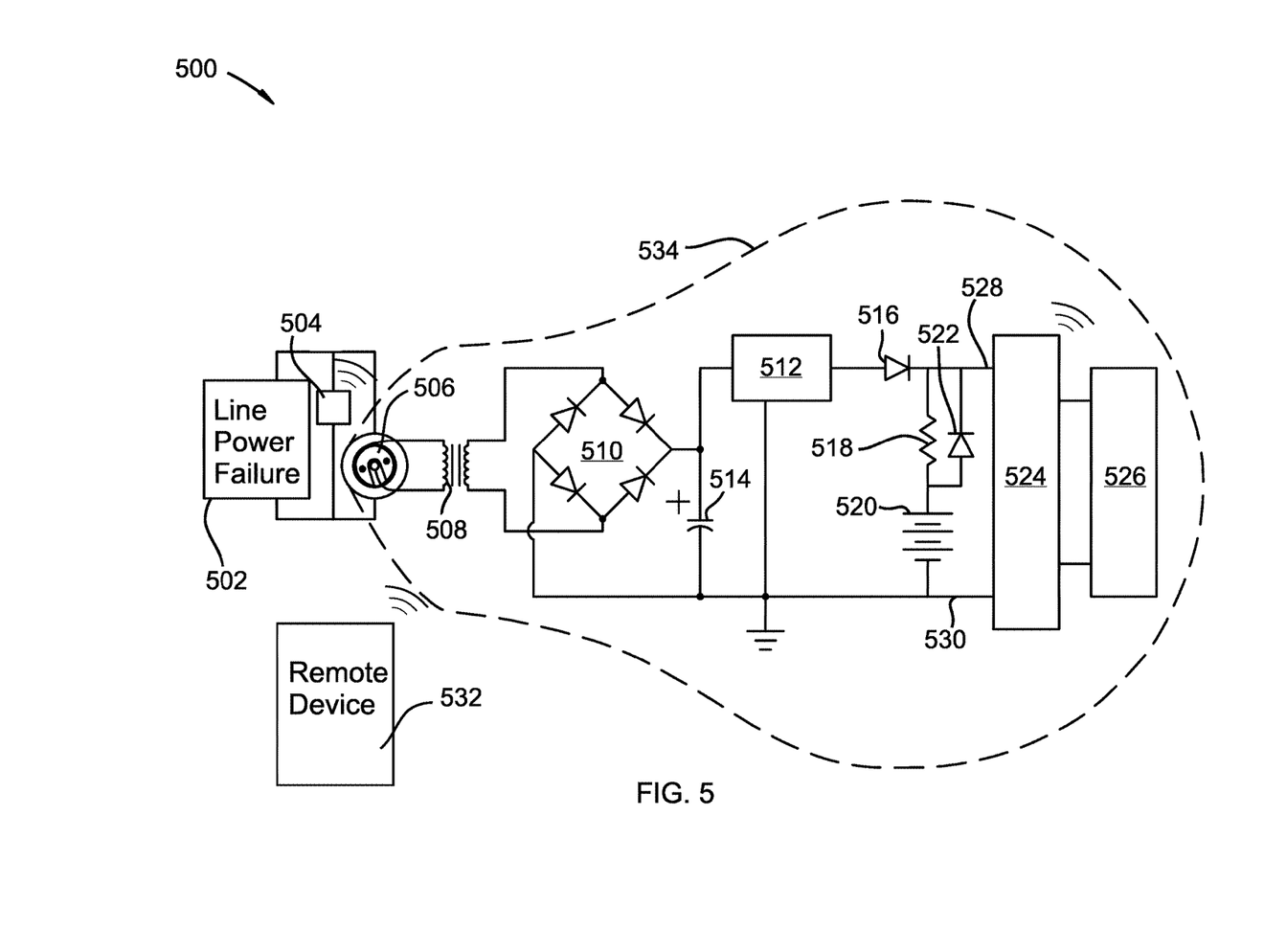
FIG. 5 shows a schematic diagram in accordance with an embodiment of the invention.

FIG. 5 shows a schematic diagram in accordance with an embodiment of the invention. Schematic diagram 500 includes power source 502, external light housing 534, light socket 506, switch device 504, power supply elements 510, 512, 514, battery 520, controller/transceiver 524, light 526, input 528, and remote user device 532. Power source 502 may be an electrical generator, solar power, hydroelectric power, or any other know power source. Light housing may include a screw base with at least two electrical conductors. The screw base may screw into a threaded socket 506. Switch device 504 may be a smart switch with wireless and wired features. Switch 504 may send and receive wireless signals and communicate with transceiver/controller 524 and user device 532. Switch 504 may also contain a button, switch, or lever for toggling a state of the light 526. Switch 504 may be a switch that is directly controlled by transceiver/controller 524 and indirectly controlled by a user toggling a button or switch located directly on the switch. For instance, when a user toggles a switch on the face of switch 504, switch 504 may not directly turn off power to light 526 but send a wired or wireless signal to a transceiver/controller 524. When transceiver/controller 524 processes the sent signal from the switch, controller/transceiver 524 may decide to turn light 526 "ON" or "OFF" based on a previous state of light 526 and leave power through switch 504 "ON" or "OFF" based on a state-of charge of battery 520 and/or a time-of-day energy usage rate. User device 534 may be used to send a wireless signal to program transceiver/controller 524, instruct transceiver/controller 524 to turn light 526 "ON" or "OFF" or to instruct switch device 504 to send a signal to transceiver/controller 524 to turn "ON" or "OFF" light 526. Battery 520 may be a rechargeable battery as discussed in reference to FIGS. 1 and 2. Transceiver/controller 524 may contain one or more processors, memory, antennas, and transceivers for transmitting/receiving Bluetooth, Wi-Fi, Sure-Fi, CDMA, GSM, etc. Input 528 may momentarily modulate a power signal supplied by switch 504 when switch 504 is toggled from an "OFF" or "NO" position. Controller/transceiver 524 may be programmed to detect a modulation in the power signal and turn light 526 "ON" or "OFF". A modulation may include a brief high to low to high power transition causing a ripple in the DC voltage supplied to controller 524. This transition may be created by a momentary (1 to 500 millisecond) break in the power supplied by switch 504 as it is toggled. Alternately, a wireless signal may be transmitted from switch 504 to controller/transceiver 524 when switch 504 is toggled instructing controller/transceiver 524 to toggle the light 526 "ON" or "OFF". Battery 520 and/or power supply 502 may supply power to transceiver/controller 524 independent of each other. Battery 520 is automatically charged when power is supplied to controller 524 by power source 520. In the event of a power failure battery 520 automatically provides power to input 528 by way of diode 522. Diode 516 allows current to flow from regulator 512 to battery 520 and controller/transceiver 524. Filter capacitor 514 may be designed to allow a particular modulation created by toggling switch 504 to pass by and be detected by controller 524. Resistor 518 allows a potential voltage to flow enabling charging of battery 520. During an off-peak time period controller/transceiver 524 may charge battery 520 by wirelessly turning on power to switch 504 without turning on lights 526. This would likely happen in the middle of the night without the knowledge of a home owner and while off-peak power is available. During an on-peak time period, when battery 520 is critically low on charge, controller/transceiver 524 may charge battery 520 by wirelessly turning on power to switch 504 without turning on lights 526. Transceiver/controller 524 may be connected to light 526 by two or more wires. Light 526 may contain multiple light sources such as LED light sources as shown and described in relation to FIG. 1. Each light source may have one or more wires connecting to transceiver/controller 524. Controller 524 may reduce power output of light 526 by decreasing a number of light sources receiving power, thus allowing light 526 to operate longer under reduced power consumption. Controller 524 may use an internal reference load (not shown) to monitor a state of charge of battery 520. In an internal state-of-charge monitoring process of controller 524, a voltage taken from input 528 may be monitored as applied to a reference load and a state-of-charge of battery 520 may be obtained when the voltage is compared to a state-of-charge reference table stored in memory in controller 524. Optimally, the state-of-charge is taken some time before an on-peak time event happens, such as an hour before, allowing time to charge a battery off-peak if necessary before an on-peak time event takes place.

Figure 6:
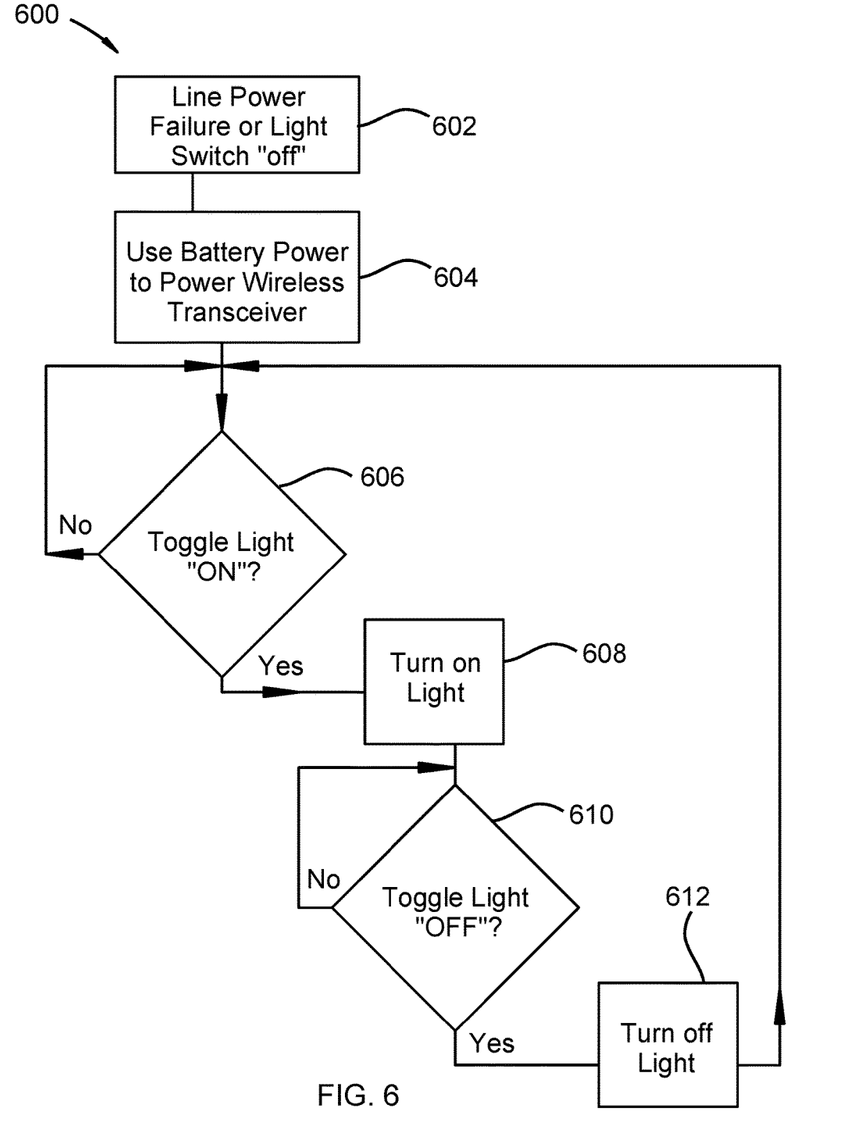
FIG. 6 shows a flow chart in accordance with an embodiment of the invention.

FIG. 6 shows a flow chart in accordance with an embodiment of the invention. Flow chart 600 includes process steps showing how a light is turned "ON" or "OFF" when no power is present. At step 602, power is not being sent from the switch. This may be the result of a power failure or the switch was commanded "OFF" by a user or a controller in a light bulb. In step 604, a light bulb, wired to the switch, uses battery power within the light bulb to power a wireless transceiver within the light bulb. At step 606, a processor within the light bulb is looking for a wireless signal to toggle the light "ON". This signal may come from a wireless device such as a smart phone, computer, battery powered wireless device, or micro-generator device such as an EnOcean motion powered wireless switch. If a command is given to turn the light "ON" during a no line power situation, battery power is used to power the light and the controller sends power to the light to turn them on 608. The controller may track a state-of-charge of the battery and reduce light output based on a battery state-of-charge. The controller then looks for a wireless signal to toggle the light "OFF". This signal may come from a wireless device such as a smart phone, computer, battery powered wireless device, or micro-generator device such as an EnOcean motion powered wireless switch. When the controller receives a wireless signal to toggle the light "OFF" the controller then toggles the light "OFF".

Figure 7:
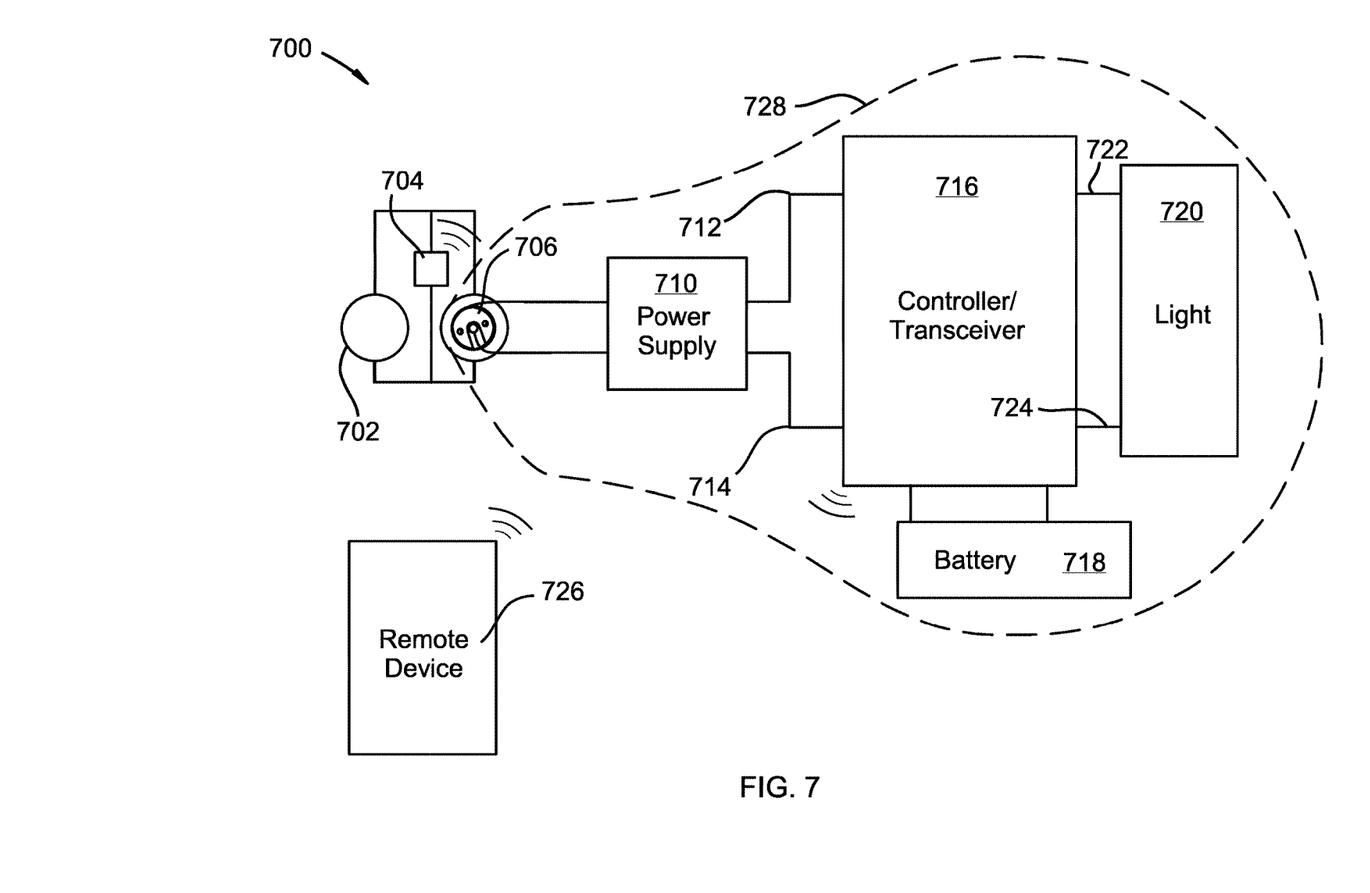
FIG. 7 shows a schematic diagram in accordance with an embodiment of the invention.

FIG. 7 shows a schematic diagram in accordance with an embodiment of the invention. Schematic diagram 700 includes power source 702, external light housing 728, light socket 706, switch device 704, power supply 710, battery 718, controller/transceiver 724, light 720, input 712 and 714, and remote user device 736. FIG. 7 is similar to FIGS. 2-5 and operate essentially the same except that power source 702 may be a DC power source and power supply 710 may serve as a regulator of the DC power source. Controller 716 may directly control power to battery 718 and light 720. Power may be supplied and sourced to and from battery 718 through wires which connect to controller 716. In a power source 702 outage, battery may be able to supply DC power backwards through power supply 710, because no transformer or diodes are need for DC to DC regulation of power, supplying power to switch 704.

Figure 8:
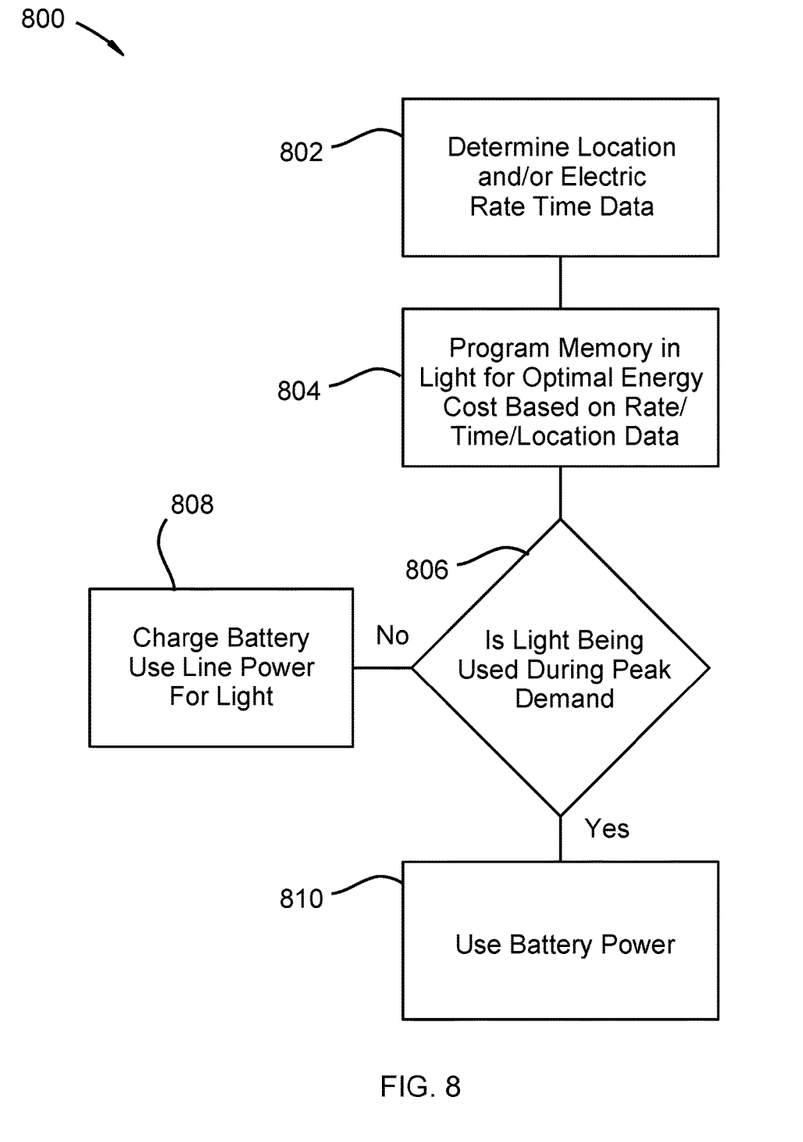
FIG. 8 shows a flow chart in accordance with an embodiment of the invention.

FIG. 8 shows a flow chart in accordance with an embodiment of the invention. As shown in block 802, method 800 includes determining a location and/or electric rate time data of a light bulb. For instance, when a light bulb is installed, light bulb controller programming may cause the light to obtain location data and electricity rate data. Location data may be obtained from a global positioning satellite GPS, a cellular tower transmission, an Internet location, or from a user device. Electrical time-of-use rates may be obtained from a global positioning satellite, a cellular tower transmission, an Internet location, or from a user device. Time-of-use rates include cost-per-kilowatt-hour over a 24-hour period for different times of the day. Time-of-use rates may change season by season. Summer months may have a different time-of-use rate table compared to winter months. In a 24-hour period during summer months, off-peak, on-peak, and partial-peak time-of-use electrical rates may be determined based on a geographic location, time-of-day, and season of the year. An off-peak time period may be from 10:00 pm to 5:00 am in one geographic location and from 6:00 pm to 8:00 am in another geographic location. On-peak and partial-peak time periods also vary according to geographic location. Cost-per-kilowatt hour for off-peak may be 0.10/KWH while on-peak may be double or triple at 0.20/KWH or 0.30/KWH with partial-peak rates somewhere in between, for instance.

A battery state-of-charge threshold may be dynamically determined based on historical light usage and time usage. For example, if a given LED light consumed 15 watts (similar to a 100 watt incandescent) for 1 hour a day on average during on-peak time a battery within the light would need to have sufficient power to power the light and the controller until an off-peak time period when the battery could be recharged with off-peak priced energy. To determine a lower battery state-of-charge threshold a watt hour calculation may be made by multiplying 15 watts consumed by 1 hour to obtain 15 watt hours. If we assume the controller in the light bulb consumes on average 3 watts per hour, a battery in the light bulb has a 600 watt hour capacity, a 20% safety charge limit is desired to remain in the battery, time-of-use rates are available, current time-of-day information is available, and expected use times from historical data are available, then we may use this information determine a lower state-of-charge safety limit threshold. A lower limit may be set as the amount of power needed to keep the battery above a lower limit state-of-charge safety of 20% while providing operational power and lighting power necessary to reach an off-peak charging time. The lower limit state-of-charge threshold can be calculated by totaling all power needed to keep the battery from going below a 20% power safety limit. If we assume (or obtain from historical records) that a light consumes 15 watts and is on for 1 hour (15 watt hours) of on-peak use, an on-peak time period lasts for a total of 6 hours per day then the total wattage consumption to reach off-peak charging time is calculated by adding 15 watt hours+15 watt hours=30 watt hour consumed during a 6 hour on-peak time period. A 20% safety limit on a 600 watt hour battery may be calculated by multiplying 600 by 0.2 to equal 120 watt hours of safety power desired to remain in the battery. The lower state-of-charge threshold may be calculated by adding 30 watt hours of power consumed by the light in the 6 hour on-peak time period and 120 watt hours of safety charge to obtain a lower state-of-charge limit of 150 watt hours. This lower state-of-charge limit is the minimum amount of power needed in the battery at the start of an on-peak period to make it on battery power to an off-peak time period. The lower threshold limit is dynamic and changes with light usage, battery capacity, safety limit values, and operational light bulb wattage. This limit may be programmed to optimized power consumption costs of using the light bulb.

This may be motivated by differing prices for electricity consumed depending on the time-of-day. In some locations, consumers may be charged different prices during different times of day, week, or season for electricity. Peak hours are times of day corresponding to higher energy prices, while off-peak rates correspond to relatively lower energy prices. Off-peak rates may apply during weekends and evenings. Peak hours may include weekdays from about 10 a.m. to 6 p.m., while holidays may be considered off-peak. In some embodiments, the second predetermined battery state-of-charge threshold is dynamically determined based on a time-of-day.

At process step 806, a determination is made if the light is being turned on during an on-peak time period. If it is, then battery power is used to power the light. If the light is not being turned on during on-peak hours then line power is used to power the light and recharge the battery if necessary.

Figure 9:
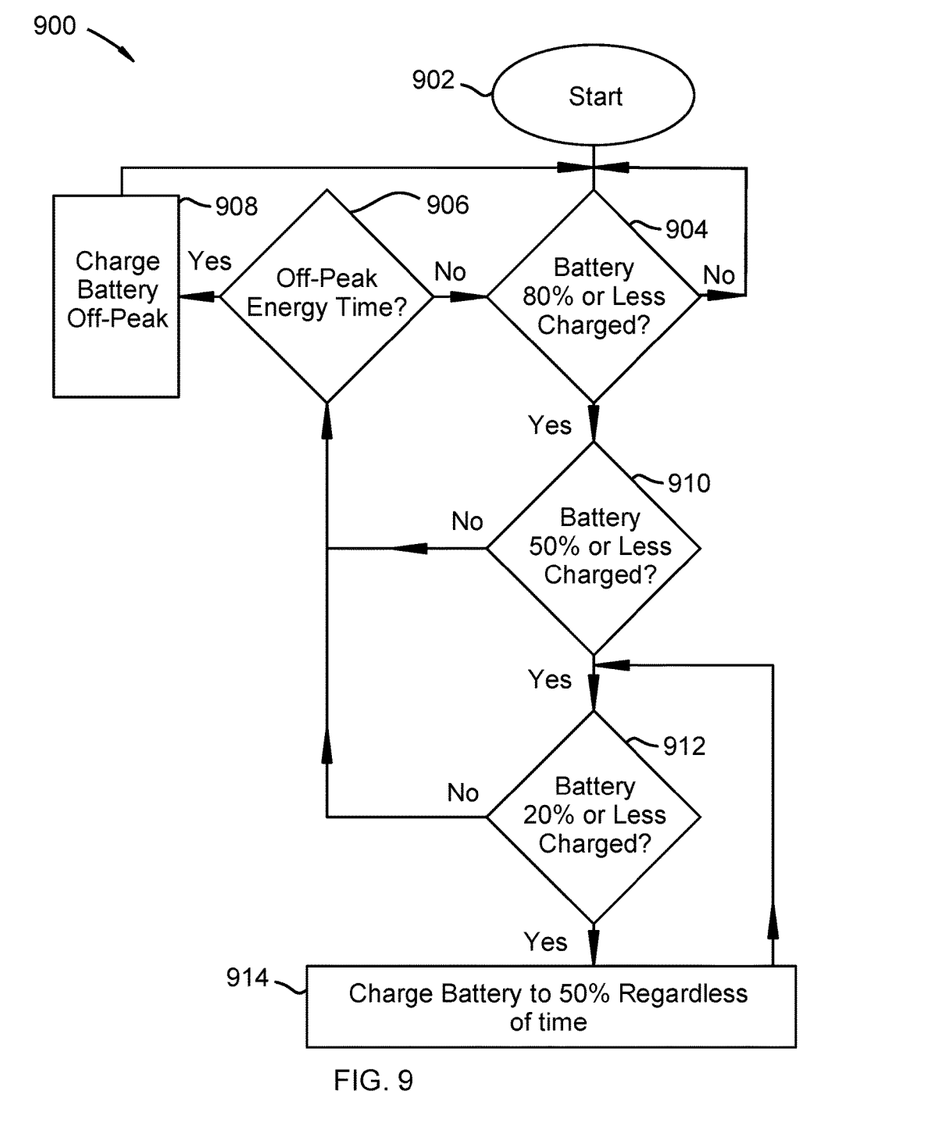
FIG. 9 shows a flow chart in accordance with an embodiment of the invention.

FIG. 9 shows a flow chart of an example of charging a battery in accordance with an embodiment of the invention. In flow chart 900, a battery state of charge is determined by a controller in a light bulb as described earlier. In the example, if a battery has a state-of-charge greater than 80% then no charging takes place. If the battery is less than 80% charged but above 50% charged 910 then a determination is made if it is an off-peak time 906. If it is off-peak the battery is charged. If it is on-peak then the battery charge continues to reduce until either an off-peak time arrives or the battery becomes 20% or less charged 912. If the battery becomes 20% or less charged and it is on-peak the battery is charged to 50% with on-peak time 914. If off-peak time arrives before the battery reaches 20% it is charged 908.

Figure 10:
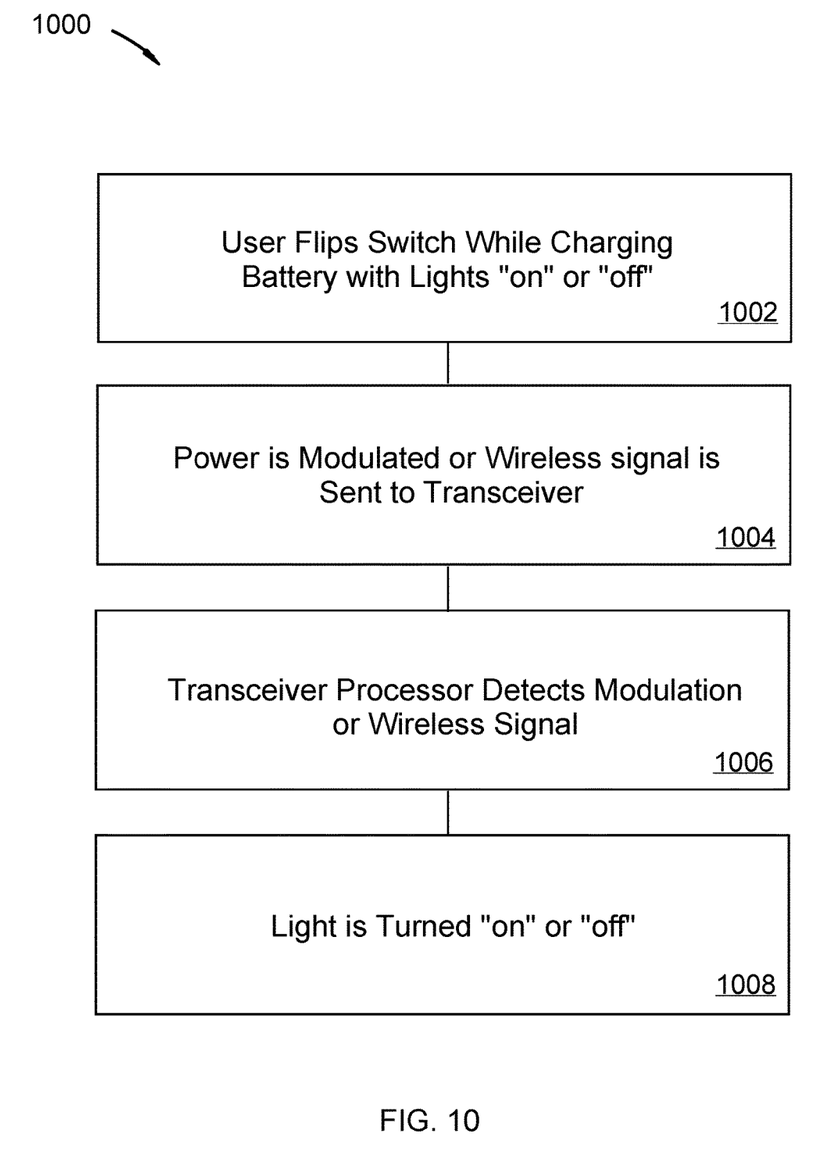
FIG. 10 shows a flow chart in accordance with an embodiment of the invention.

FIG. 10 shows a flow chart in accordance with an embodiment of the invention. In flow chart 1000, a user toggles a light switch while a battery is charging 1002, meaning that the switch is already sending power to the light bulb. When the switch is toggled, a wireless signal or a modulation of the power line occurs 1004 and is received by a controller/transceiver in the light bulb 1006 and the controller toggles the light "ON" or "OFF" 1008.

The invention claimed is:

1. A method of charging a light bulb comprising:
   detecting with a processor and memory in the light bulb that a battery within the light bulb is below a predetermined battery state-of-charge threshold;
   providing an external switch device powered by an external power source coupled with the processor and the battery;
   sending a wireless signal from a wireless transceiver within the light bulb to the switch device to supply power to the battery within the light bulb when the battery within the light bulb is below the predetermined battery state-of-charge threshold;
   and charging the battery within the light bulb via the switch device and external power source.

2. The method of claim 1, wherein the light bulb comprises an Edison screw base.

3. The method of claim 1, wherein the processor receives an input from the external switch device.

4. The method of claim 3, wherein the input is derived from a wire which connects the external switch device to the light bulb.

5. The method of claim 3, wherein the input is a wireless signal from the transceiver.

6. The method of claim 3, wherein the input causes the light bulb to remain in an "OFF" state while the battery is charging unless a user toggles the external switch device "ON".

7. The method of claim 1, wherein the predetermined battery state-of-charge threshold is dynamically determined based on a historical time-of-day usage.

8. The method of claim 1, wherein the predetermined battery state-of-charge threshold is dynamically determined based on a cost-per-kilowatt-hour and a historical time-of-day.

9. The method of claim 1, wherein the predetermined battery state-of-charge threshold is determined based on historical usage of the light bulb.

10. The method of claim 1, wherein the light bulb is automatically controlled by the processor to change an output intensity of the light bulb based on a historical time-of-day usage.

11. The method of claim 1, wherein the light bulb is automatically controlled by the processor to change an output intensity of the light bulb based on a state-of-charge of the battery and historical usage.

12. The method of claim 1, wherein the light bulb is automatically controlled by the processor to change an output intensity of the light bulb based on a state-of-charge of the battery and an expected output of the battery over a predetermined time period.

13. The method of claim 1, wherein when the remote light switch is toggled from an "ON" state to an "OFF" while the light bulb is off-peak charging and the charge of the battery is below the predetermined battery charge threshold, the light bulb turns "OFF" and the power stays supplied to the light bulb.

14. The method of claim 1, wherein the light bulb comprises one or more light sources.

15. The method of claim 14, wherein the one or more light sources are LED (light emitting diode) light sources.

16. The method of claim 15, wherein the LED light sources surround the battery within the light bulb.

17. The method of claim 15, wherein each of the one or more LED light sources is individually controllable by the processor.

18. The method of claim 17, wherein the processor is programmed to selectively turn "ON" or "OFF" each of the one or more LED light sources based on a desired intensity of the light bulb.

19. The method of claim 17, wherein the processor is programmed to selectively turn "ON" or "OFF" each of the one or more LED light sources based on a desired color of the light bulb.

20. The method of claim 17, wherein the processor is programmed to selectively turn "ON" or "OFF" each of the one or more LED light sources based on a state-of-charge of the battery.

* * * * *